(12) United States Patent
Manion et al.

(10) Patent No.: US 10,342,401 B2
(45) Date of Patent: Jul. 9, 2019

(54) BATTERY PACK

(71) Applicant: TECHTRONIC INDUSTRIES CO. LTD, Tsuen Wan, New Territories (HK)

(72) Inventors: Thomas Manion, Tallmadge, OH (US); Douglas Arney, North Canton, OH (US); Douglas Ritterling, Chagrin Falls, OH (US)

(73) Assignee: Techtronic Industries Co. Ltd., Tsuen Wan, New Territories (HK)

( * ) Notice: Subject to any disclaimer, the term of this patent is extended or adjusted under 35 U.S.C. 154(b) by 595 days.

(21) Appl. No.: 14/896,989

(22) PCT Filed: May 26, 2015

(86) PCT No.: PCT/US2015/032461
§ 371 (c)(1),
(2) Date: Dec. 9, 2015

(87) PCT Pub. No.: WO2016/085540
PCT Pub. Date: Jun. 2, 2016

(65) Prior Publication Data
US 2016/0293912 A1    Oct. 6, 2016

(30) Foreign Application Priority Data
Nov. 26, 2014   (CN) .......................... 2014 3 0476283

(51) Int. Cl.
*A47L 5/24* (2006.01)
*A47L 5/36* (2006.01)
(Continued)

(52) U.S. Cl.
CPC ............... *A47L 7/0004* (2013.01); *A47L 5/24* (2013.01); *A47L 5/362* (2013.01); *A47L 9/1683* (2013.01);
(Continued)

(58) Field of Classification Search
CPC ............ H01M 2/1044; H01M 2/1055; H01M 2/1066; H01M 10/0525; H01M 2220/30;
(Continued)

(56) References Cited

U.S. PATENT DOCUMENTS

2005/0155177 A1\* 7/2005 Baer ....................... A47L 5/365
15/353
2012/0025129 A1   2/2012 Liang et al.
(Continued)

FOREIGN PATENT DOCUMENTS

WO    2008035811 A1    3/2008

OTHER PUBLICATIONS

Australian Patent Office Examination Report No. 1 for Application No. 92015354771 dated Jan. 30, 2018, 3 pages.
(Continued)

*Primary Examiner* — Eugenia Wang
(74) *Attorney, Agent, or Firm* — Michael Best & Friedrich LLP

(57) ABSTRACT

A battery pack for selective attachment to a receptacle includes a housing enclosing a battery, a handle extending from the housing and defining an aperture between the housing and the handle, and a latching arrangement coupled to the housing and engageable with the receptacle for inhibiting the battery pack from being removed from the receptacle. The latching arrangement includes a latch member and an actuator movable relative to the housing from a first position to a second position to move the latch member from a latched position to and an unlatched position. The actuator is at least partially located within the aperture when the actuator is in the first position.

17 Claims, 8 Drawing Sheets

(51) Int. Cl.
  *A47L 7/00* (2006.01)
  *A47L 9/16* (2006.01)
  *A47L 9/28* (2006.01)
  *B25F 5/00* (2006.01)
  *B25F 5/02* (2006.01)
  *H01M 2/10* (2006.01)
  *H01M 10/0525* (2010.01)
(52) U.S. Cl.
  CPC ............. *A47L 9/2884* (2013.01); *B25F 5/00* (2013.01); *B25F 5/02* (2013.01); *H01M 2/1055* (2013.01); *H01M 2/1066* (2013.01); *H01M 10/0525* (2013.01); *H01M 2220/30* (2013.01)
(58) Field of Classification Search
  CPC ........ B25F 5/00; A47L 9/1683; A47L 9/2884; A47L 5/24; A47L 5/362
  See application file for complete search history.

(56)         References Cited

U.S. PATENT DOCUMENTS

2012/0251229 A1\* 10/2012 Liang ..................... B25F 5/02
                                              403/325
2014/0079973 A1    3/2014 Liang et al.

OTHER PUBLICATIONS

International Search Report and Written Opinion for Application No. PCT/US2015/032461 dated Jul. 24, 2015, 10 pages.

\* cited by examiner

BATTERY PACK

CROSS-REFERENCE TO RELATED APPLICATIONS

This application claims priority to Chinese Design Application No. 201430476283.8, filed Nov. 26, 2014, the entire content of which is incorporated herein by reference.

BACKGROUND

The present invention relates to battery packs, and more particularly to latching arrangements for battery packs.

SUMMARY

In one embodiment, the invention provides a battery pack for selective attachment to a receptacle. The battery pack includes a housing enclosing a battery, a handle extending from the housing and defining an aperture between the housing and the handle, and a latching arrangement coupled to the housing and engageable with the receptacle for inhibiting the battery pack from being removed from the receptacle. The latching arrangement includes a latch member and an actuator movable relative to the housing from a first position to a second position to move the latch member from a latched position to and an unlatched position. The actuator is at least partially located within the aperture when the actuator is in the first position.

In another embodiment, the invention provides a battery pack for selective attachment to a receptacle. The battery pack includes a housing enclosing a battery and defining an insertion axis along which the battery pack is movable to insert or remove the battery pack from the receptacle. The battery pack further includes a latching arrangement coupled to the housing and engageable with the receptacle for inhibiting the battery pack from being removed from the receptacle. The latching arrangement includes a latch member and an actuator movable relative to the housing from a first position to a second position in a direction along the insertion axis to move the latch member from a latched position to and an unlatched position in a direction transverse to the insertion axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
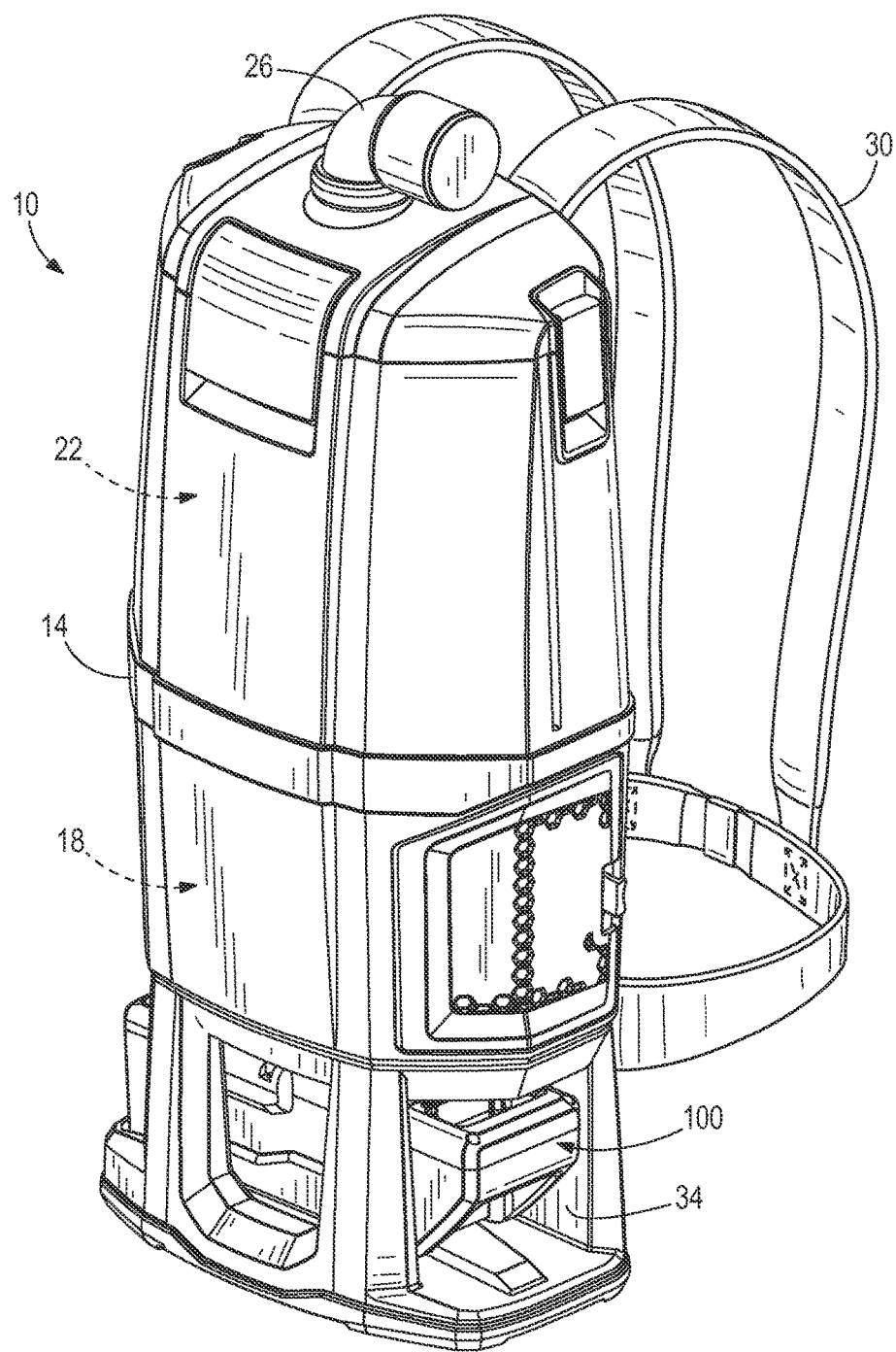
FIG. 1 is a perspective view of a vacuum cleaner including a battery pack according to one embodiment.

FIG. 1 illustrates a vacuum cleaner 10 including a battery pack 100 according to one embodiment. The vacuum cleaner 10 includes a main body 14 containing a suction source 18, such as an electric motor and fan assembly. A dirt separator 22 is in fluid communication with the suction source 18, and an inlet duct 26 is provided to draw air into the dirt separator 22. The dirt separator 22 filters dirt and debris from air drawn from the inlet duct 26 and can include a filter bag or one or more cyclonic separators.

The illustrated vacuum cleaner 10 is a backpack-style vacuum cleaner and includes straps 30 coupled to the main body 14, allowing the vacuum cleaner 10 to be carried on a user's back. In other embodiments, other types and styles of vacuum cleaners can be utilized (e.g., canister, handheld, upright, utility, etc.). Furthermore, although the illustrated vacuum cleaner 10 is intended for dry surfaces, the vacuum cleaner can be configured for wet surfaces. Therefore, the term "vacuum cleaner" used herein should be understood to include carpet extractors, hard floor cleaners, and the like. Furthermore, although the battery pack 100 is described for use with a vacuum cleaner, the battery pack 100 could also be used with other powered devices such as power tools, outdoor power equipment, or any other device that utilizes a battery to power electric components such as a motor, a light, or electronics.

With continued reference to FIG. 1, the vacuum cleaner 10 further includes a receptacle 34 sized and shaped to receive the battery pack 100. The battery pack 100 is insertable into the receptacle 34 to provide power to the suction source 18 and is removable from the receptacle 34 for storage, recharging, replacement, and the like. The receptacle 34 need not be used with the vacuum cleaner 10, however. For example, the receptacle 34 could be provided on any of the other powered devices listed above. In other embodiments, the receptacle could be provided on a battery charger. In addition, although the illustrated receptacle 34 receives the battery pack 100 therein such that the battery pack 100 is substantially surrounded by the receptacle 34, in other embodiments, the receptacle 34 can be located on any face of the vacuum cleaner 10 or other powered device. Thus, the receptacle 34 need not encapsulate the battery pack 100, but may only receive a portion of the battery pack 100.

Figure 2:
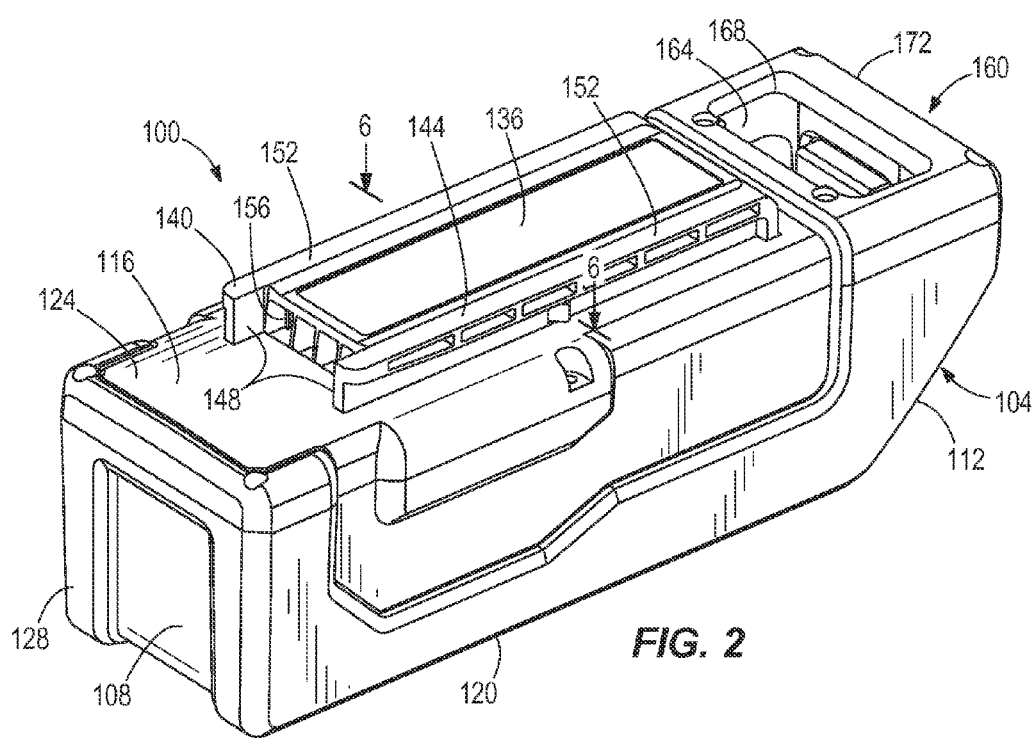
FIG. 2 is a perspective view of the battery pack of FIG. 1.

With reference to the orientation of FIG. 2, the battery pack 100 includes a housing 104 having a front side 108, a back side 112, a top side 116, and a bottom side 120. The housing 104 encloses a battery (not shown), which typically includes one or more rechargeable cells. The cells can be arranged in series, parallel, or a series-parallel combination to provide a desired nominal voltage and capacity. In the illustrated embodiment, the battery has a nominal voltage of about 40 volts. In some embodiments, the battery is a lithium-ion type battery, having lithium-based cells with a chemistry of, for example, lithium-cobalt, lithium-manganese, or lithium-manganese spinel. Alternatively, the cells can have any other suitable chemistry.

Figure 4:
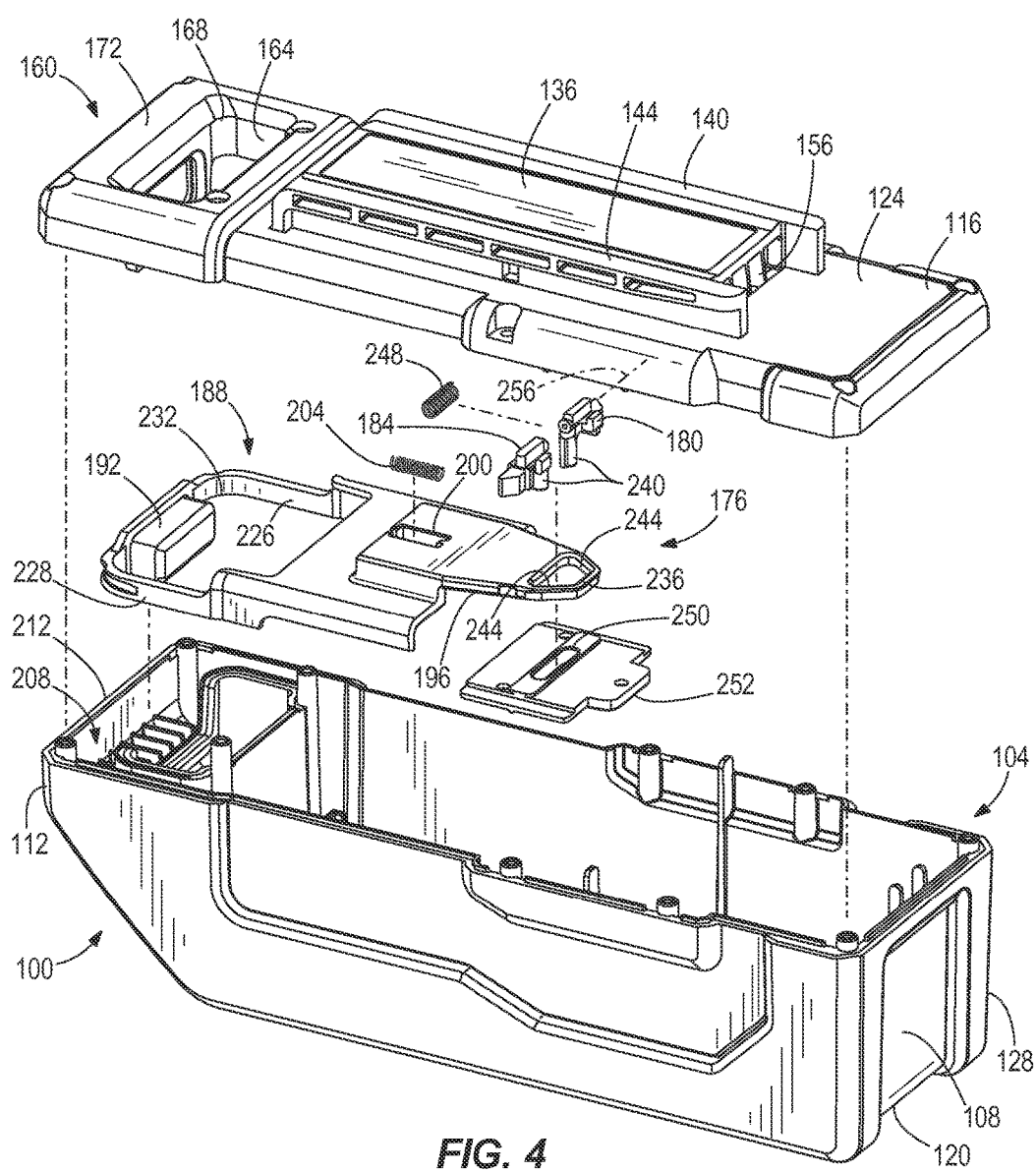
FIG. 4 is an exploded view of the battery pack of FIG. 1.

The illustrated housing 104 includes first and second cooperating housing portions 124, 128 that can be coupled together by any suitable means, such as by fasteners, adhesives, ultrasonic welding, a snap-fit, and the like (FIG. 4). The first housing portion 124 defines the top side 116 of the battery pack 100, and the second housing portion 128 defines the bottom side 120 of the battery pack 100. In other embodiments, the housing 104 can include more than two housing portions. Alternatively, the housing 104 can be formed as a single, unitary piece.

Figure 8:
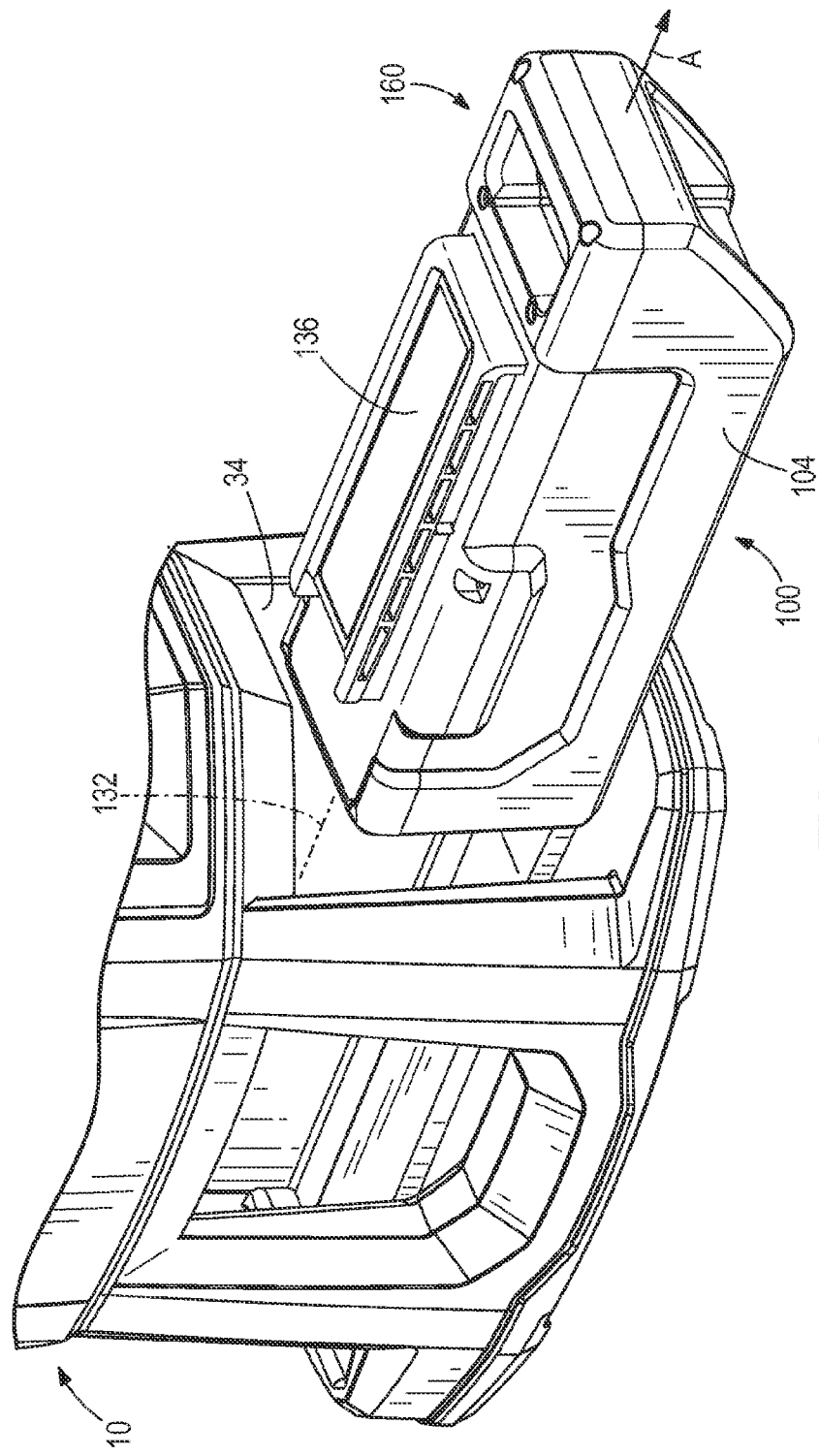
FIG. 8 is a perspective view illustrating the battery pack being removed from the vacuum cleaner of FIG. 1.

Referring to FIG. 8, the housing 104 defines a longitudinal insertion axis 132 along which the battery pack 100 is slidable to insert or remove the battery pack 100 from the receptacle 34. The battery pack 100 is movable in a forward direction along the insertion axis 132 to insert the battery pack 100 into the receptacle 34 and in a rearward direction (i.e., in the direction of arrow A) along the insertion axis 132 to remove the battery pack 100 from the receptacle 34.

Referring again to FIG. 2, the battery pack 100 further includes a rail arrangement 136 extending along the top side 116 to facilitate coupling the battery pack 100 to the receptacle 34. The rail arrangement 136 includes first and second guide rails 140, 144, each extending along the housing 104 in a direction parallel to the insertion axis 132. Each of the illustrated guide rails 140, 144 is generally L-shaped, having a first wall 148 extending generally perpendicularly from the top side 116 and a second wall 152 extending generally perpendicularly from the first wall 148. The guide rails 140, 144 are sized and shaped to engage a corresponding rail arrangement (not shown) provided on the receptacle 34. In the illustrated embodiment, the rail arrangement 136 also houses electrical connectors 156 at its front end. The electrical connectors 156 mate with corresponding connectors (not shown) provided on the receptacle 34 to permit electrical communication between the battery pack 100 and the receptacle 34 when the battery pack 100 is coupled to the receptacle 34.

Figure 3:
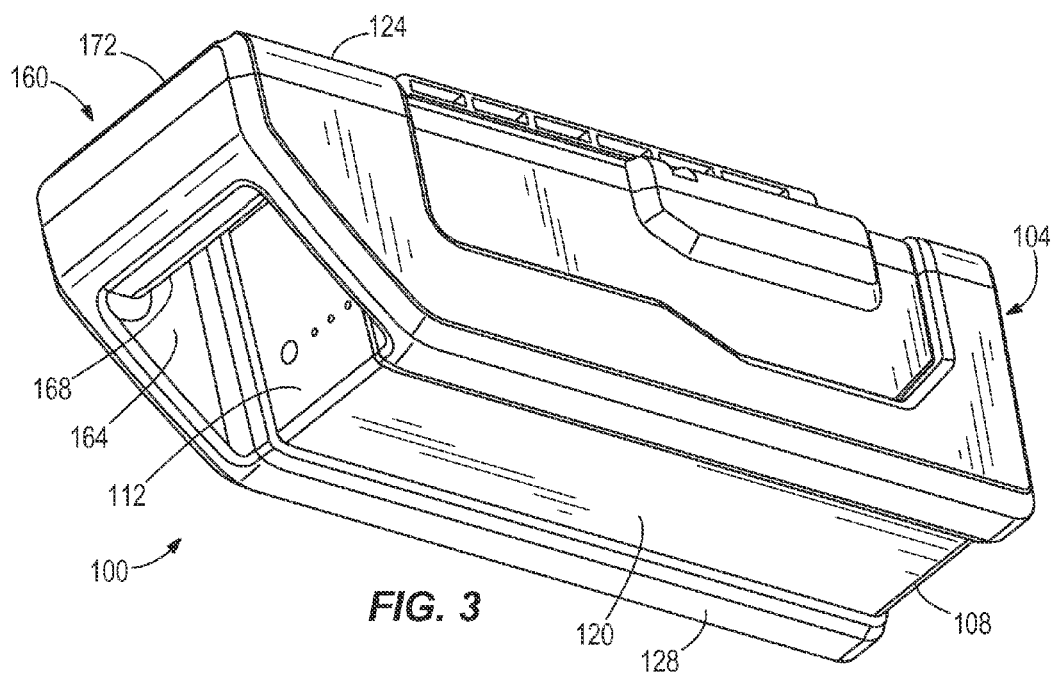
FIG. 3 is another perspective view of the battery pack of FIG. 1.

With reference to FIGS. 2-4, the battery pack 100 further includes a handle 160 extending from the back side 112 of the housing 104. The illustrated handle 160 is integrally formed with the first and second housing portions 124, 128. In other embodiments, the handle 160 can be formed separately and coupled to the housing 104 by any suitable means. The handle 160 includes an inner wall 164 defining an aperture 168 between the housing 104 and the handle 160. The aperture 168 is sized to receive a user's hand so that the user can grasp a grip portion 172 of the handle 160. As such, in some embodiments the aperture 168 can have a length (measured transverse to the insertion axis 132) between about 1 inch and about 6 inches, and the aperture 168 can have a width (measured along the insertion axis 132) between about ¾ inch and about 3 inches.

Figure 5:
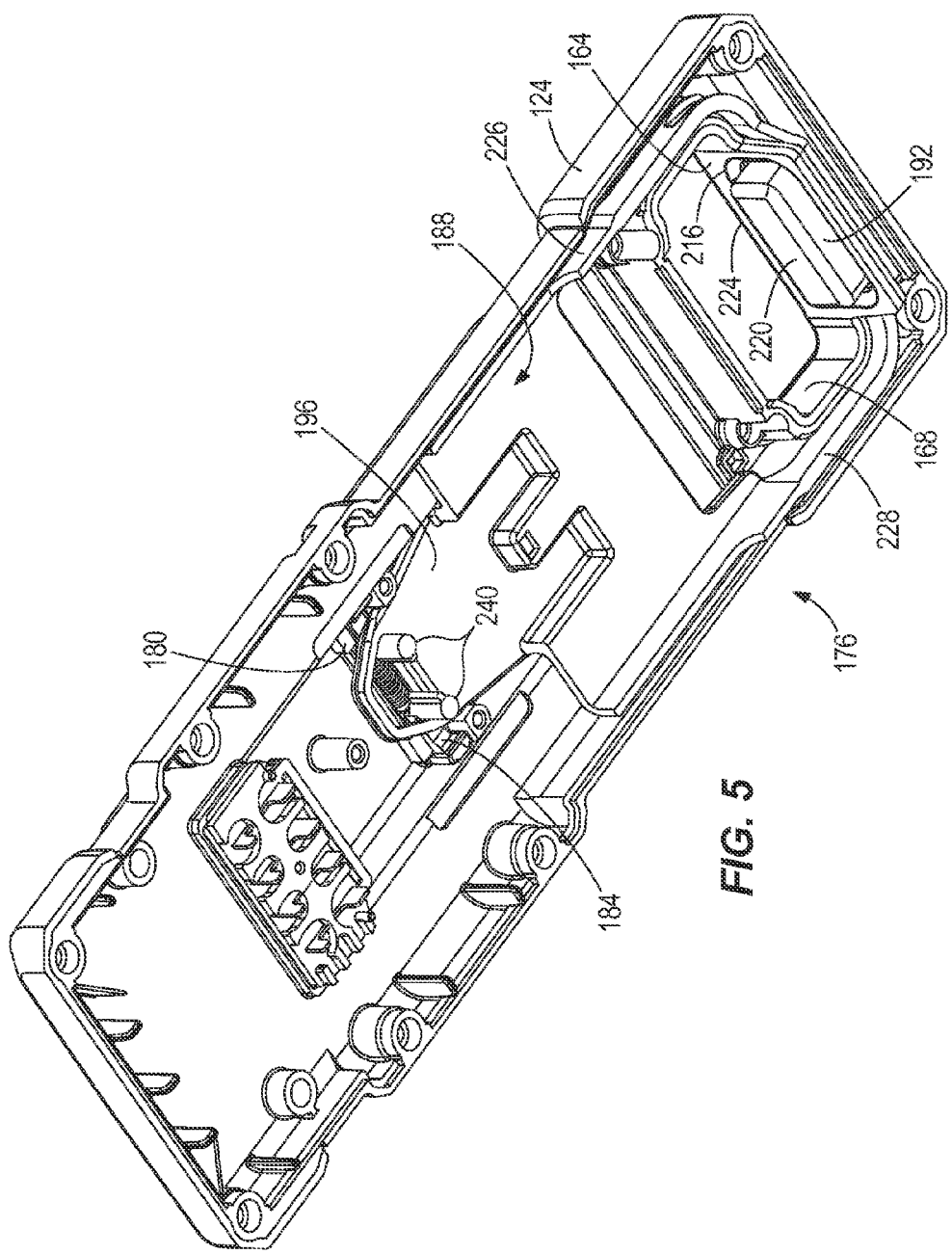
FIG. 5 illustrates a latching arrangement of the battery pack of FIG. 1.
Figure 6:
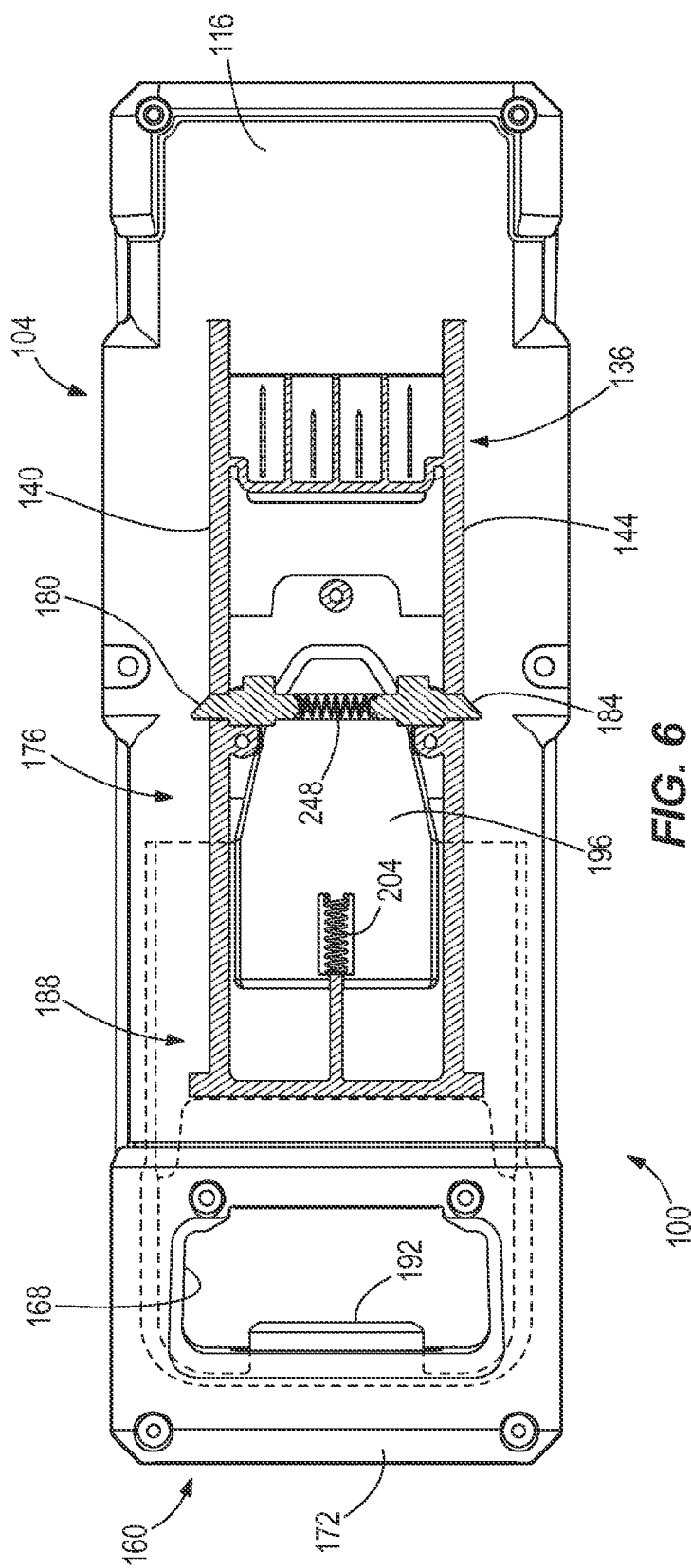
FIG. 6 is a cross-sectional view of the battery pack taken along line 6-6 in FIG. 1 and illustrating the latching arrangement in a latched state.
Figure 7:
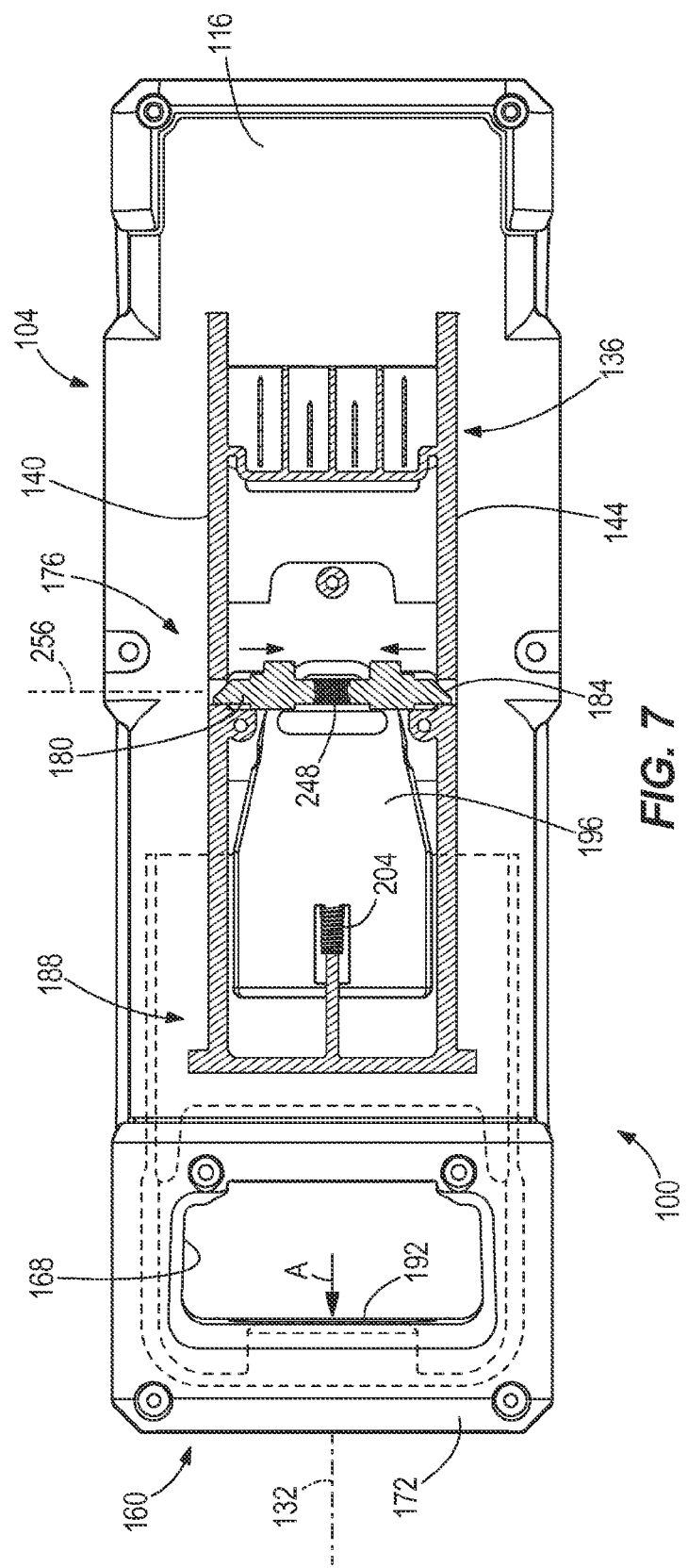
FIG. 7 is a cross-sectional view of the battery pack of FIG. 6, illustrating the latching arrangement in an unlatched state.

Referring to FIGS. 4-7, the battery pack 100 includes a latching arrangement 176 coupled to the housing 104. The latching arrangement 176 is engageable with the receptacle 34 to inhibit the battery pack 100 from being removed from the receptacle 34. The latching arrangement 176 includes a first latch member 180, a second latch member 184 opposite the first latch member 176, and an actuator 188. Although the illustrated latching arrangement 176 includes two latch members 180, 184, in other embodiments, the latching arrangement 176 can include a single latch member or more than two latch members. As described in greater detail below, the actuator 188 is movable relative to the housing 104 from a first position to a second position to move the latch members 180, 184 from a latched position (FIG. 6) to an unlatched position (FIG. 7). As shown in FIG. 6, the actuator is at least partially located within the aperture when the actuator is in the first position.

With reference to FIGS. 4 and 5, the actuator 188 includes a user-manipulable button portion 192 and an engaging portion 196 spaced from the button portion 192. The actuator 188 also includes a recess 200 that receives a first spring member 204, such as a coil spring (FIG. 4). The first spring member 204 is engaged between the recess 200 and the housing 104 to force the actuator 188 toward the first position.

The handle 160 is generally hollow and includes a cavity 208 defined between the inner wall 164 and an outer wall 212 spaced from the inner wall 164 (FIG. 4). A portion of the actuator 188 is disposed within the cavity 208, and the button portion 192 extends through an opening 216 in the inner wall 164, into the handle aperture 168 (FIG. 5). A pressing surface 220 of the button portion 192 extends generally parallel with a surface 224 of the inner wall 164 surrounding the opening 216. The actuator 188 also includes two legs 226, 228 that extend between the button portion 192 and the engagement portion 196 (FIG. 4). The legs 226, 228 are disposed within the cavity 208 and extend from the grip portion 172 of the handle 160 toward the latch members 180, 184. The legs 226, 228 extend adjacent the handle aperture 168 and partially define an aperture 232 in the actuator 188 that surrounds the handle aperture 168.

With continued reference to FIG. 4, the actuator 188 has a generally trapezoidal-shaped aperture 236 in the engaging portion 196 that receives pins 240 on the respective latch members 180, 184. Interior walls of the aperture 236 act as ramp surfaces 244 that bear against the pins 240 to draw the latch members 180, 184 toward each other when the actuator 188 moves toward the second position. A second spring member 248 (e.g., a coil spring) is disposed between the latch members 180, 184 to force the latch members 180, 184 away from each other and into engagement with the ramp surfaces 244. The ends of the pins 240 are received within a slot 250 in a guide plate 252 fixed to the housing 104. The guide plate 252 constrains movement of the latch members 180, 184 such that the latch members 180, 184 move along a latching axis 256 transverse to the insertion axis 132. Thus, the latching arrangement 176 converts linear movement of the actuator 188 along the insertion axis 132 into linear movement of the latch members 180, 184 along the latching axis 256.

With reference to FIG. 6, when the latching arrangement 176 is in a latched state, the latch members 180, 184 extend outwardly through openings in the guide rails 140, 144 to engage with corresponding recesses (not shown) in the receptacle 34, thereby inhibiting removal of the battery pack 100 from the receptacle 34. To unlatch the battery pack 100, a user puts his or her fingers through the aperture 168 to grasp the grip portion 172 of the handle 160. Next, the user depresses the button portion 192 of the actuator 188 to pull the actuator 188 in the direction of arrow A, against the force of the first spring member 204 (FIG. 7). As the actuator 188 moves along the insertion axis 132 (and away from the latch members 180, 184 in the embodiment illustrated in FIGS. 2-7), the button portion 192 retracts into the grip portion 172, and the ramp surfaces 244 bear against the pins 240 on the latch members 180, 184 to move the latch members 180, 184 inwardly along the latching axis 256, against the force of the second spring member 248. Accordingly, the latch members 180, 184 retract into the rail arrangement 136 and disengage from the receptacle 34. The user can then pull on the handle 160 in the direction of arrow A to withdraw the battery pack 100 from the receptacle 34 (FIG. 8).

In some embodiments, the receptacle 34 can include an additional set of recesses (not shown) in which the latch members 180, 184 are engageable to define a second latched state (not shown) offset along the insertion axis (132) from the latched state of FIG. 6. In the second latched state, the battery pack 100 can be secured to the receptacle 34 without electric communication between the battery pack 100 and the receptacle 34. The second latched state can by bypassed if, for example, the user continues to maintain the actuator 188 in the second position (FIG. 7).

Because the button portion 192 is easily accessible when the user grasps the grip portion 172 of the handle 160, the user can actuate the latching arrangement 176 with the same hand used to grasp the handle 160, allowing the battery pack 100 to be unlatched and withdrawn from the receptacle 34 with one hand. Additionally, the position of the button 192 allows the user to depress the button 192 and remove the battery pack 100 with a single pulling motion in the removal direction A along the insertion axis 132. The handle 160 also provides a convenient means to carry the battery pack 100 when it is separated from the receptacle 34.

Figure 9:
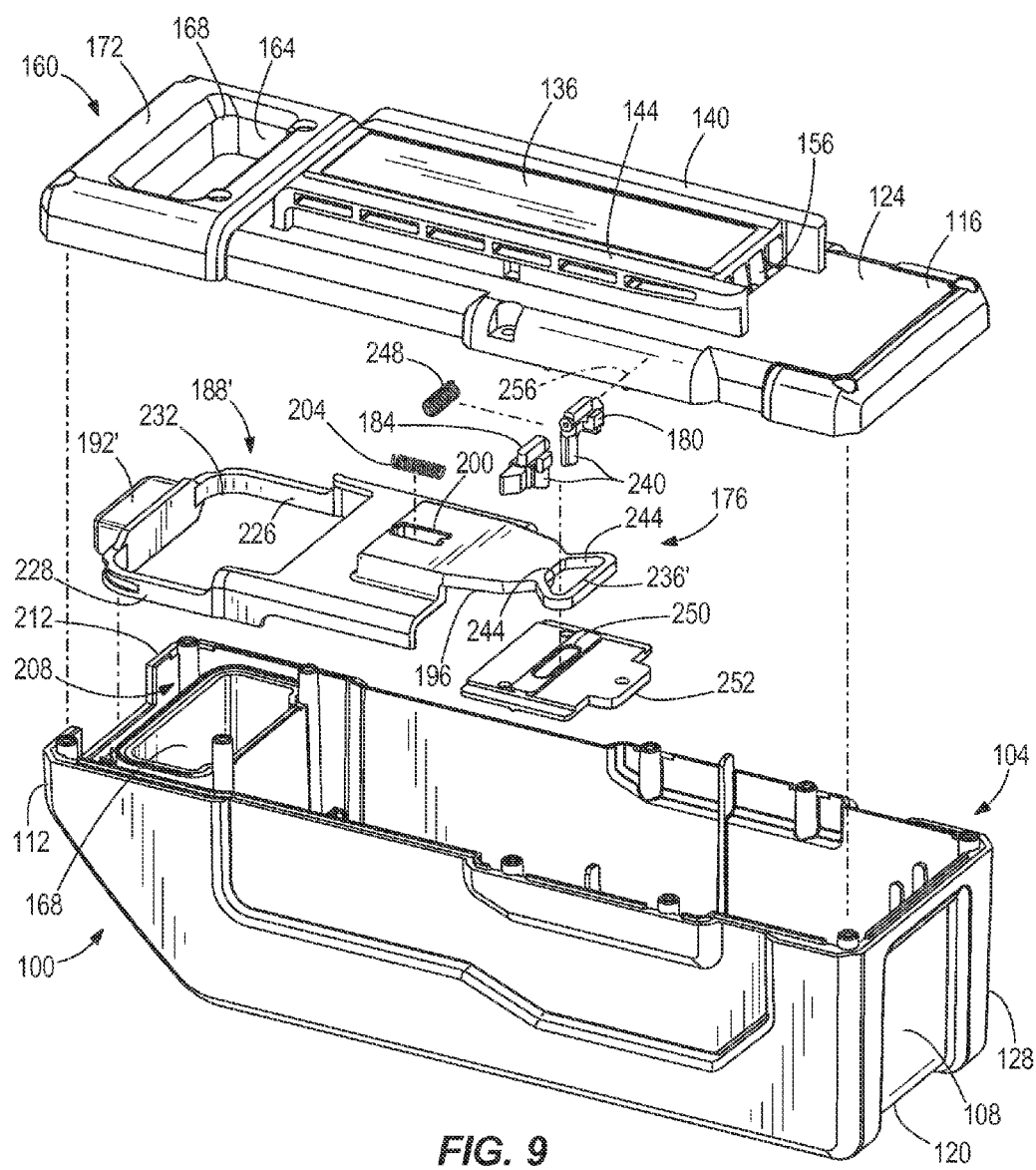
FIG. 9 is an exploded view of a battery pack according to another embodiment.

In an alternative embodiment illustrated in FIG. 9, the actuator 188' unlatches the battery pack 100 by moving along the insertion axis 132 in a direction toward the latch members 180, 184. As illustrated in FIG. 9, the button portion 192' extends through an opening in the outer wall 212. In this embodiment, the generally trapezoidal-shaped aperture 236' in the engaging portion 196 is arranged to actuate the latch members 180, 184 as the button 192' retracts into the grip portion 172 when the actuator 188' moves from the first position to the second position.

Various features and advantages of the invention are set forth in the following claims.

What is claimed is:

1. A battery pack for selective attachment to a receptacle, the battery pack comprising:
   a housing enclosing a battery;
   a handle extending from the housing and defining an aperture between the housing and the handle;
   a latching arrangement coupled to the housing and engageable with the receptacle for inhibiting the battery pack from being removed from the receptacle, the latching arrangement including
   a latch member, and
   an actuator movable relative to the housing from a first position to a second position to move the latch member from a latched position to an unlatched position,
   wherein the actuator is at least partially located within the aperture when the actuator is in the first position.

2. The battery pack of claim 1,
   wherein the handle includes an inner wall defining the aperture, and
   wherein the inner wall includes an opening through which the actuator extends when the actuator is in the first position.

3. The battery pack of claim 2,
   wherein the wall includes a first surface surrounding the opening, and
   wherein the actuator includes a pressing surface extending generally parallel to the first surface.

4. The battery pack of claim 2, wherein the handle further includes an outer wall and a cavity defined between the inner wall and the outer wall, and wherein the actuator is at least partially disposed within the cavity.

5. The battery pack of claim 4, wherein the handle includes a grip portion, and a portion of the actuator in the cavity extends adjacent the aperture from the grip portion toward the latch member.

6. The battery pack of claim 1, wherein the actuator retracts at least partially into the handle when in the second position.

7. The battery pack of claim 6, wherein the handle includes a grip portion and the actuator retracts at least partially into the grip portion when in the second position.

8. The battery pack of claim 1, wherein the actuator moves from the first position toward the second position in a direction away from the latch member.

9. The battery pack of claim 1, wherein the aperture is sized to receive a user's hand.

10. The battery pack of claim 1,
    wherein the housing defines an insertion axis, and
    wherein the battery pack is movable along the insertion axis to insert or remove the battery pack from the receptacle.

11. The battery pack of claim 10, further comprising a guide rail extending parallel to the insertion axis, wherein the latch member extends through the guide rail when in the latched position to be engageable with the receptacle.

12. The battery pack of claim 10, wherein the actuator is movable between the first position and the second position in a direction generally along the insertion axis, and wherein the latch member is movable between the latched position and the unlatched position in a direction transverse to the insertion axis.

13. The battery pack of claim 1, wherein the latching arrangement further includes a first spring member that forces the actuator toward the first position and a second spring member that forces the latch member toward the latched position.

14. The battery pack of claim 1,
    wherein the latch member is a first latch member,
    wherein the latching arrangement further includes a second latch member opposite the first latch member, and
    wherein the actuator draws the first latch member and the second latch member toward each other when the actuator moves from the first position to the second position.

15. The battery pack of claim 1, wherein the actuator includes a ramp surface that bears against the latch member to move the latch member from the latched position to the unlatched position when the actuator moves from the first position to the second position.

16. The battery pack of claim 1, further comprising a guide rail extending along the housing, wherein the latch member extends through the guide rail when in the latched position.

17. The battery pack of claim 1, wherein the battery is configured to power a vacuum cleaner.

* * * * *